(12) United States Patent
Lu (10) Patent No.: US 9,851,561 B2
(45) Date of Patent: Dec. 26, 2017

(54) HEAD-MOUNTED DEVICE WITH REAR-FACING CAMERA

(71) Applicant: Intel Corporation, Santa Clara, CA (US)

(72) Inventor: Mei Lu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/757,590

(22) Filed: Dec. 23, 2015

(65) Prior Publication Data

US 2017/0184846 A1    Jun. 29, 2017

(51) Int. Cl.
| | |
|---|---|
| *G09G 5/00* | (2006.01) |
| *G09G 1/06* | (2006.01) |
| *H04N 5/89* | (2006.01) |
| *G02B 27/01* | (2006.01) |
| *G06F 3/01* | (2006.01) |
| *H04N 7/18* | (2006.01) |
| *H04N 13/00* | (2006.01) |

(52) U.S. Cl.
CPC .......... *G02B 27/017* (2013.01); *G06F 3/012* (2013.01); *G06F 3/013* (2013.01); *H04N 7/183* (2013.01); *G02B 2027/014* (2013.01); *G02B 2027/0138* (2013.01); *G02B 2027/0141* (2013.01)

(58) Field of Classification Search
CPC .. G09G 5/00; G09G 1/06; H04N 5/89; H04N 13/00

USPC ................ 345/7, 8, 9, 156; 348/40
See application file for complete search history.

(56) References Cited

U.S. PATENT DOCUMENTS

| | | | |
|---|---|---|---|
| 8,941,561 B1 * | 1/2015 | Starner | G06F 3/012 345/7 |
| 2006/0019614 A1 * | 1/2006 | Yamasaki | G02B 27/017 455/90.2 |
| 2010/0079356 A1 * | 4/2010 | Hoellwarth | G02B 27/017 345/8 |
| 2012/0249587 A1 * | 10/2012 | Anderson | G06F 3/04895 345/633 |
| 2014/0327770 A1 | 11/2014 | Wagreich | |
| 2014/0361976 A1 * | 12/2014 | Osman | G02B 27/0172 345/156 |
| 2016/0357261 A1 * | 12/2016 | Bristol | A63F 13/24 3/24 |
| 2017/0038831 A1 * | 2/2017 | Vidal | G06F 3/011 |

\* cited by examiner

*Primary Examiner* — Daquan Zhao (74) *Attorney, Agent, or Firm* — Schwegman Lundberg & Woessner, P.A.

(57) ABSTRACT

Various systems and methods for displaying a rearview camera feed in a head-mounted display are described herein. A system for displaying a rearview camera feed in a head-mounted display (HMD) comprises a display surface, a motion detector to detect a head movement of a user of the head-mounted display, the head movement having a spatial direction, a gaze detection unit to detect an eye gaze of the user, a camera interface to receive visual data from a rear-facing camera array, and a presentation module to display a presentation on the display surface when the direction of the head movement is consistent with the eye gaze, the presentation including the visual data from the rear-facing camera array.

27 Claims, 5 Drawing Sheets

HEAD-MOUNTED DEVICE WITH REAR-FACING CAMERA

TECHNICAL FIELD

Embodiments described herein generally relate to wearable devices and in particular, to a head-mounted device with a rear-facing camera.

BACKGROUND

A head-mounted display (HMD), also sometimes referred to as a helmet-mounted display, is a device worn on the head or as part of a helmet that has a small display optic in front of one or both eyes. An HMD may be used for various applications including augmented reality or virtual reality simulations. HMDs are used in a variety of fields such as military, gaming, sporting, engineering, and training.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein implement a rear-facing camera on a head-mounted display (HMD). HMDs come in a variety of form factors including goggles, visors, glasses, helmets with face shields, and the like. As technology improves, HMDs are becoming more affordable for consumer devices and smaller and lighter to accommodate various applications.

Athletes in outdoor activities, such as running, cycling, motorcycling, or skiing, are highly interested in knowing what is happening behind them for both safety and competition purposes. Described herein are systems that may be embodied on a HMD that has a display and one or multiple rear-facing cameras. Using a head movement and eye gaze, users are able to easily bring up the view of the rear-facing camera(s) on the display without turning their head or body to look over their shoulder. As a benefit, a user is able to safely and proactively scan for traffic or activities that are behind her.

Figure 1:
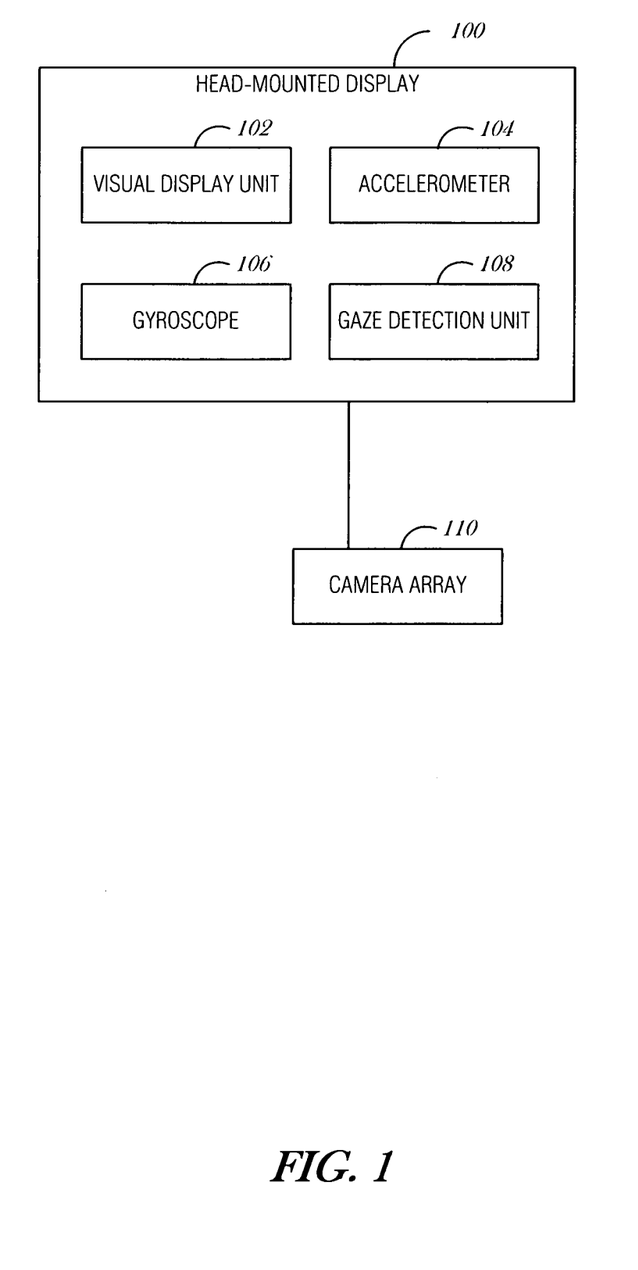
FIG. 1 is a schematic drawing illustrating a head-mounted display, according to an embodiment.

FIG. 1 is a schematic drawing illustrating a head-mounted display 100, according to an embodiment. The HMD 100 includes a visual display unit 102, an accelerometer 104, a gyroscope 106, and a gaze detection unit 108. In addition, a rear-facing camera array 110 may be coupled to the HMD 100. The rear-facing camera array 110 may be integrated into the HMD 100 or communicatively coupled (e.g., using a wired or wireless connection) to the HMD 100.

The visual display unit 102 is operable to present a displayed image to the wearer (e.g., user) of the HMD 100. The visual display unit 102 may operate in any manner including projecting images onto a translucent surface between the user's eye(s) and the outer world, the translucent surface may implement mirrors, lenses, prisms, color filters, or other optical apparatus to generate an image. The visual display unit 102 may operate by projecting images directly onto the user's retinas. In general, the visual display unit 102 operates to provide an augmented reality (AR) experience where the user is able to view most of the real world around her with the computer generated image (CGI) being a relatively small portion of the user's field of view. The mixture of the virtual reality images and the real-world experience provides an immersive, mobile, and flexible experience.

The HMD 100 includes an inertial tracking system that employs a sensitive inertial measurement unit (IMU). The IMU may include the accelerometer 104 and the gyroscope 106, and optionally include a magnetometer. The IMU is an electronic device that measures a specific force, angular rate, and sometimes magnetic field around the device. The IMU may calculate six degrees of freedom allowing the HMD 100 to align virtual information to the physical world or to generally determine the position or movement of the user's head.

The gaze detection unit 108 may employ an eye tracker to measure the point of gaze, allowing the HMD 100 to determine where the use is looking. Gaze detection may be performed using a non-contact, optical method to determine eye motion. Infrared light may be reflected from the user's eye and sensed by an inward-facing video camera or some other optical sensor. The information is then analyzed to extract eye rotation based on the changes in the reflections from the user's retina. Another implementation may use video to track eye movement by analyzing a corneal reflection (e.g., the first Purkinje image) and the center of the pupil. Use of multiple Purkinje reflections may be used as a more sensitive eye tracking method. Other tracking methods may also be used, such as tracking retinal blood vessels, infrared tracking, or near-infrared tracking techniques. The gaze detection unit 108 may calibrate the user's eye positions before actual use.

The camera array 110 may include one or more infrared or visible light cameras, able to focus at long-range or short-range with narrow or large fields of view. The camera array 110 may include gimbals or other mechanical or electromechanical mechanism to automatically level the cameras while the HMD 100 is moving. For example, the HMD 100 may include a recessed pocket in which a camera is housed on a gimbal. When the wearer looks up or down, the gimbaled camera may automatically level itself so as to maintain a relatively level field of view. In addition, cameras in the camera array 110 may include electromotors to pan the camera from left to right or tilt the camera from up to down. Pan and tilt controls may be used to maintain a relatively level field of view. Gimbals and electromotors may be used in combination to stabilize the field of view when the HMD 100 is moving. In addition to, or alternatively, cameras in the camera array 110 may include image processing features to stabilize the image using specialized hardware or software. Thus, any form or image stabilization including, but not limited to optical image stabilization (OIS), sensor-shift or mechanical stabilization, or digital image stabilization may be used alone or in combination to stabilize the images captured by the rear-facing camera array 110.

In operation, while the user is wearing the HMD 100, the user may perform a combination movement of turning/tilting their head and gazing in a direction consistent with looking over their shoulder in the same direction as they turned/tilted their head. The combination movement is detected by the on-board IMU (e.g., the accelerometer 104 and gyroscope 106), which triggers the visual display unit 102 to begin displayed the camera view from one or more cameras in the rear-facing camera array 110. The position, size, transparency, border color, timeout to fade, and other aspects of the displayed image or video may be user configured. When more than one camera is disposed in the camera array 110, a camera having a view consistent with the direction that the user turned/tilted/gazed may be preferentially used. For example, if the user turns her head to the left, dips her chin slightly downward to the left shoulder, and gazes to the lower left of the HMD's field of view, a camera that has a field of view of the environment over the user's left shoulder may be selected for display on the HMD 100. Multiple camera images may be interlaced, stitched, or fused together to provide a panoramic view. In such an example, the user may be provided with a full rearview image in the HMD 100. The full rearview image may be relatively small due to the aspect ratio and the field of view used, but it may still prove useful in certain situations, such as to spot car lights when on a bicycle.

Users in outdoor activities, such as running, cycling, motorcycling, or skiing, are highly interested ill knowing what is approaching from behind. The awareness provided by the systems and method described herein helps them to avoid potential collisions with cars or other people in the same activity (e.g., during a group ride of bicycles). During races, the awareness will help them to timely adjust their racing strategies or effort. This system allows users to use natural and intuitive head movement and eye gaze to safely scan the environment behind them.

This system may be implemented on any a head-worn device (e.g., smart glasses, goggles, or helmets) with a display. Example interactions are: when a user turns the head slightly to the right and look downward, on the display of the head-worn device, the user will see video images from the camera about what is behind the user from the center to the right side; when a user turns the head slightly to the left and looks downward, the user will see images about what is behind from the center to the left side. When the user returns her head to the normal forward position, video images from the rear-facing camera will be turned off so that she may focus on the road conditions and sport activities. There may be a timeout before the video images fade or disappear from view.

The intuitive mechanism used here provide distinct advantages over the conventional method of turning their body or head significantly to look back in order to know what is approaching from behind. Turning their body or head to look back is largely unsafe. Further, it influences their aerodynamic forms and negatively impacts focus or performance. Thus it is undesirable to athletes, especially during races. This system will allow users to easily maintain awareness of what is approaching from behind without turning their body or head backward or to the side.

Figure 2:
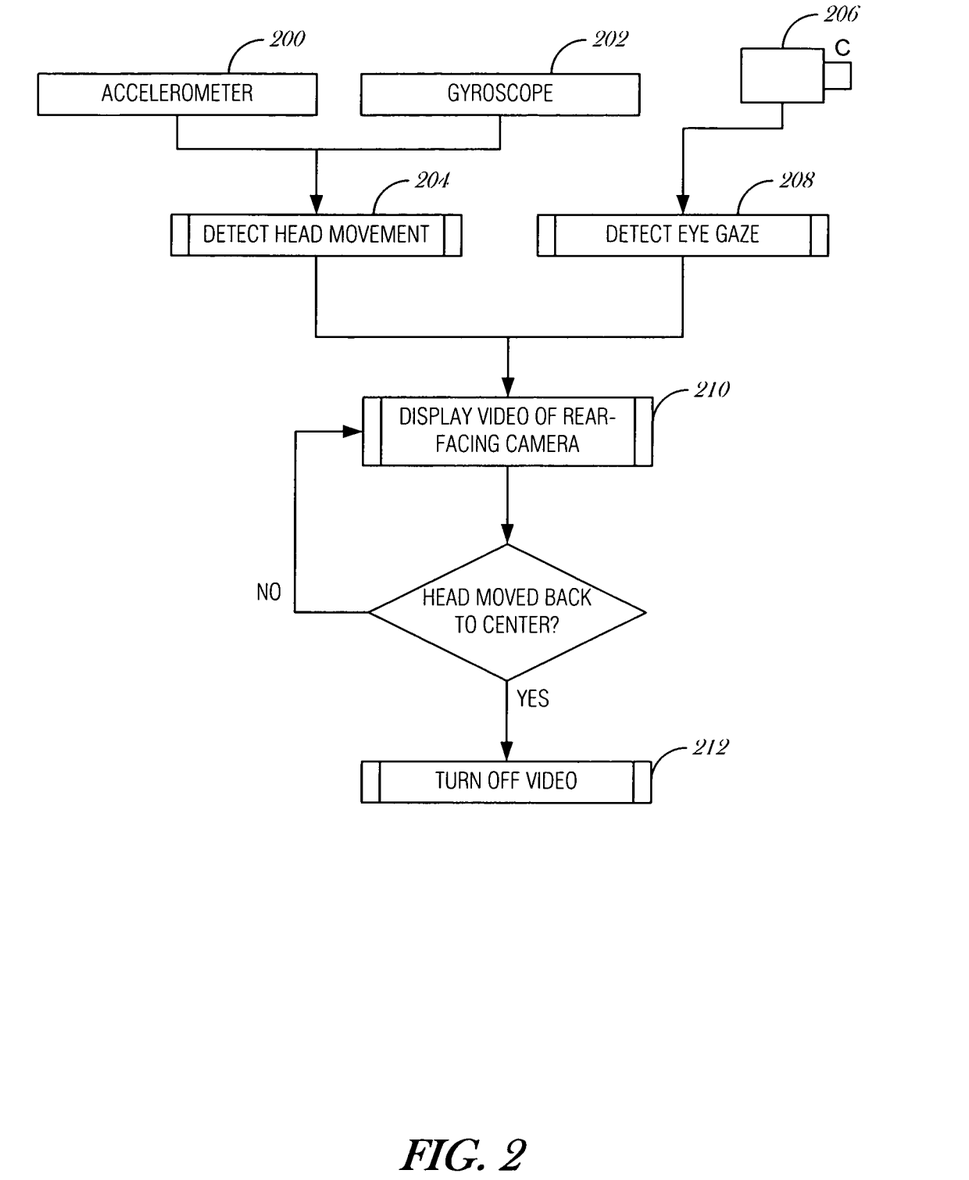
FIG. 2 is a flowchart illustrating control and data flow, according to an embodiment.

FIG. 2 is a flowchart illustrating control and data flow, according to an embodiment. An accelerometer 200 and a gyroscope 202 are used to detect a slight head movement to the left or right (operation 204). The amount of head movement may be configurable, for example fifteen degrees of head movement may be used as a threshold value. A head movement past ninety degrees from straightforward is often sufficient for the user to directly observe what is behind them while interfering with forward observations. Accordingly, the threshold amount of head movement is preferably less than ninety degrees from off center, but more than a minimal amount of head movement (e.g., two degrees). The system may be configured to ignore minimal head movement which may occur through the normal motions of biking, running, etc. and which the user may not want to trigger the rear-facing camera imagery.

In conjunction with head movement, one or more eye gaze detection cameras 206 are used to detect the user's eye gaze (operation 208) being downward and in the same direction as the head movement detected at operation 204. Using eye gaze in combination with head movement may also reduce the number of false positive and false triggers of the rearward video display.

When both the head movement and the eye gaze are detected and consistent, then a visual display is presented on the user's HMD, where the visual display includes images or video of the environment behind the user (operation 210). The images or video may be consistent with the direction of the user's head turn/gaze. The images or video may be presented until the user's head is detected as moving back to the center line (forward facing). At this point, the camera feeds are turned off and the HMD presentation of the rearward environment is terminated (operation 212).

It is understood that the rearward facing camera display may be displayed in addition to other elements of an augmented reality (AR) environment. For example, while the user is biking, a map may be displayed in AR on the HMD. When the user turns and gazes, the rearward facing camera feed may be displayed in addition to the map. Depending on the design of the graphical user interface (GUI) in the HMD, the rearward facing imagery may be overlaid on the map, translucent, or the map may move or shrink to make room for the rearward facing image.

Figure 3:
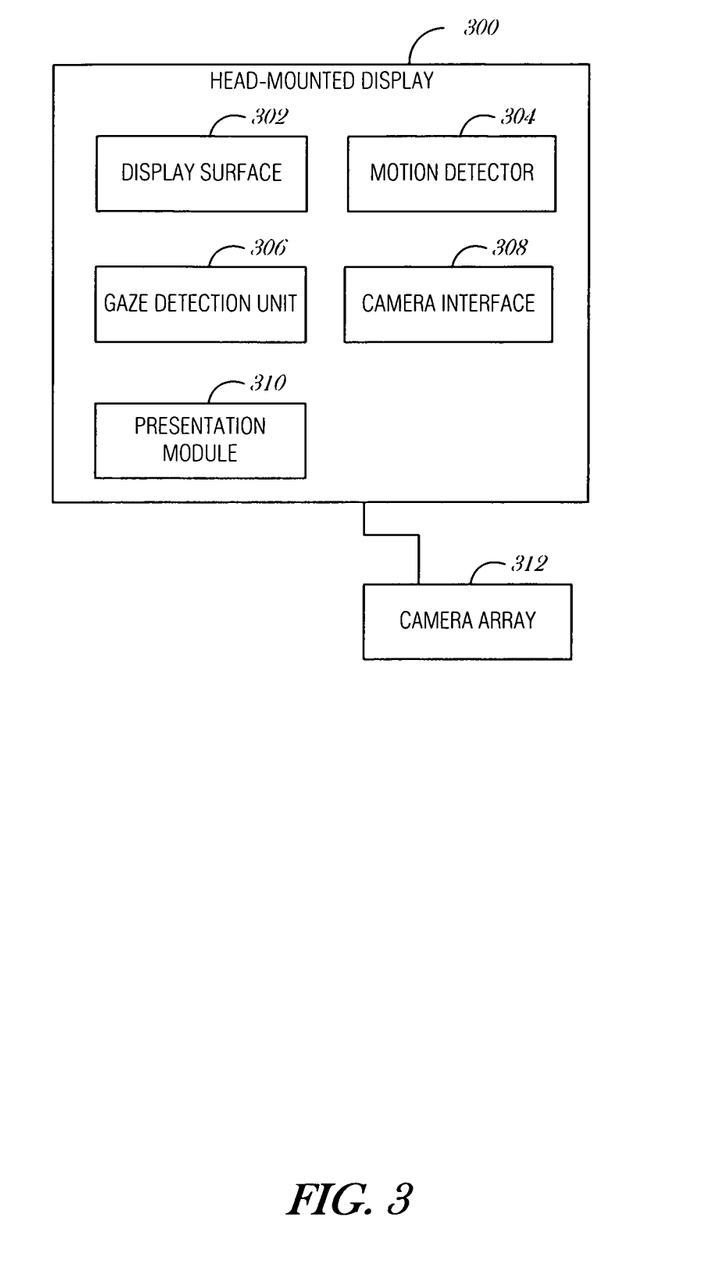
FIG. 3 is a block diagram illustrating a system for displaying a rearview camera feed in a head-mounted display (HMD), according to an embodiment.

FIG. 3 is a block diagram illustrating a system for displaying a rearview camera feed in a head-mounted display (HMD) 300, according to an embodiment. The HMD 300 may include a display surface 302, a motion detector 304, a gaze detection unit 306, a camera interface 308, and a presentation module 310. The HMD 300 may incorporate or be communicatively coupled to a rear-facing camera array 312.

The display surface 302 may be an electronic screen, such as a liquid crystal display (LCD), electroluminescent display, electrophoretic display, fiber-optic display, field emission display, light emitting diode (LED) display, plasma display, vacuum fluorescent display (VFD), or virtual retinal display (VRD). The display surface 302 may be a passive surface, such as a mirrored lens, which is translucent and allows an image to be project upon it to provide an augmented reality environment.

The motion detector 304 may be configured to detect a head movement of a user of the head-mounted display, the head movement having a spatial direction. In an embodiment, the spatial direction comprises a pitch portion and a yaw portion, wherein the pitch portion and the yaw portion indicate that the head movement is to a side and down relative to an initial forward-center position. In a further embodiment, the presentation module 310 is to discontinue displaying the presentation when the direction of the head movement returns to the initial forward-center position. It is understood that a person's head may move in six degrees of freedom: forward-backward (x-axis), left-right (y-axis), up-down (z-axis), rotationally around the x-axis (roll), rotation around the y-axis (pitch), or rotation around the z-axis (yaw). Thus, a person who turns their head to look left or right without tilting their chin up or down, would incur a yaw angle around the z-axis. Similar, a pitch angle is one that is observed when a person looks up or down. Roll angle may be observed when a person tilts their entire head in a half-shrug.

In an embodiment, to detect the head movement, the motion detector 304 is to determine whether the head movement exceeds a threshold off-center yaw angle. In a further embodiment, the threshold off-center yaw angle is in the inclusive range of two degrees and ninety degrees. On-center is based on a generally forward looking person with negligible chin tilt. The on-center position may be calibrated, for example, when the user first begins use of the HMD 300. The on-center position may be based on gyroscopes that determine the user's head position relative to the absolute horizon in the x-y plane. In a further embodiment, the threshold off-center yaw angle is configurable by the user. The user may set the yaw angle by entering into a configuration mode of the HMD 300, turning their head to a selected position, and setting the position as the threshold yaw angle. Similarly, a threshold pitch angle may be set. Alternatively, the user may input a selected metric to define the threshold angles.

In an embodiment, to detect the head movement, the motion detector 304 is to determine whether the head movement exceeds a threshold off-horizontal pitch angle. Yaw and pitch angles may be used independently to trigger the rear-view camera display. In other embodiments, the directionality of the yaw is used to select a particular camera view to display in the HMD 300.

The gaze detection unit 306 may be configured to detect an eye gaze of the user. In an embodiment, to detect the eye gaze of the user, the gaze detection unit 306 is to implement a non-contact, optical technique to track eye motion. In an embodiment, the non-contact, optical technique comprises detecting projected infrared light that is reflected off of an eye using an inward-facing optical sensor mounted on the HMD. In another embodiment, the non-contact, optical technique comprises analyzing a relationship between a corneal reflection and a pupil of an eye, using an inward-facing optical sensor mounted on the HMD 300.

The camera interface 308 may be configured to receive visual data from a rear-facing camera array 312. In an embodiment, the visual data comprises an image. For example, when the user turns their head and looks toward the rear, a static image of the rearward environment may be presented. The static image provides a snapshot of the environment and may be useful to reduce power consumption in the HMD 300. In an embodiment, the visual data comprises video. Video is advantageous to provide moment-to-moment changes of the environment behind the user.

In an embodiment, the rear-facing camera array 312 is incorporated into the HMD 300. The rear-facing camera array 312 may include various types or numbers of cameras, such as infrared cameras, visible light cameras, ultrasonic cameras, etc. The cameras in the rear-facing camera array 312 may be mounted on gimbals to provide image stabilization. The cameras may also provide digital image stabilization. In another embodiment, the rear-facing camera array 312 is wirelessly coupled to the HMD 300. For example, the rear-facing camera array 312 may be worn on a vest or mounted to a bicycle seat and communicatively coupled to the HMD 300 using Bluetooth.

The presentation module 310 may be configured to display a presentation on the display surface 302 when the direction of the head movement is consistent with the eye gaze, the presentation including the visual data from the rear-facing camera array 312. In an embodiment, to display the presentation, the presentation module 310 is to select a camera from the rear-facing camera array 312 that provides a video feed consistent with the direction of the head movement and the eye gaze and display the video feed on the display surface 302. In a further embodiment, the camera provides a stabilized image.

Figure 4:
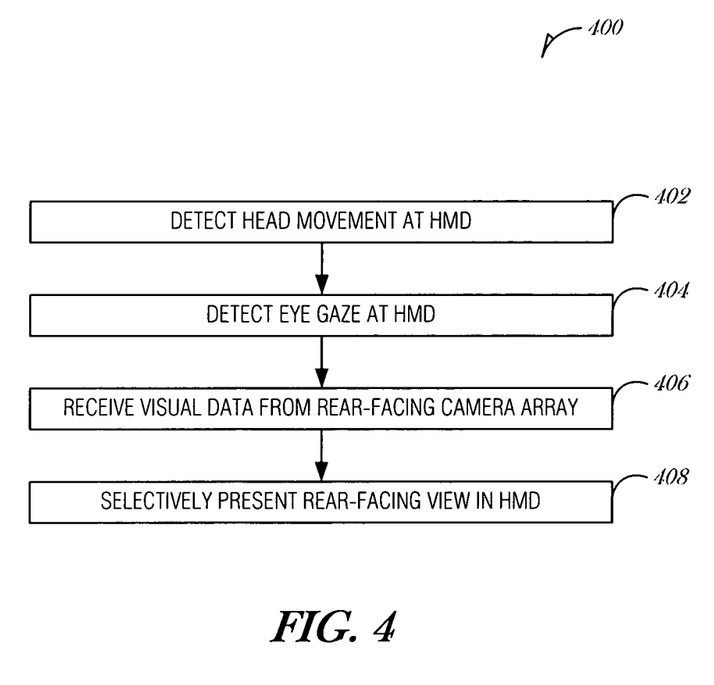
FIG. 4 is a flowchart illustrating a method of displaying a rearview camera feed in a head-mounted display (HMD), according to an embodiment.

FIG. 4 is a flowchart illustrating a method 400 of displaying a rearview camera feed in a head-mounted display (HMD), according to an embodiment. At block 402, a head movement of a user of the head-mounted display is detected at the HMD, the head movement having a spatial direction. In an embodiment, the spatial direction comprises a pitch portion and a yaw portion, where the pitch portion and the yaw portion indicate that the head movement is to a side and down relative to an initial forward-center position. In a further embodiment, the method 400 includes discontinuing displaying the presentation when the direction of the head movement returns to the initial forward-center position. So when the user turns their head back to the front facing position, the video is turned off.

In an embodiment, detecting the head movement comprises receiving data from an inertial measurement unit in the HMD and determining whether the head movement exceeds a threshold off-center yaw angle. In a further embodiment, the threshold off-center yaw angle is in the inclusive range of two degrees and ninety degrees. In another embodiment, the threshold off-center yaw angle is configurable by the user.

In an embodiment, detecting the head movement comprises receiving data from an inertial measurement unit in the HMD and determining whether the head movement exceeds a threshold off-horizontal pitch angle.

In an embodiment, the rear-facing camera array is incorporated into the HMD. In another embodiment, the rear-facing camera array is wirelessly coupled to the HMD.

At block 404, an eye gaze of the user is detected at the HMD. In an embodiment, detecting the eye gaze of the user comprises implementing a non-contact, optical technique to track eye motion. In a further embodiment, the non-contact, optical technique comprises detecting projected infrared light that is reflected off of an eye using an inward-facing optical sensor mounted on the HMD. In another embodiment, the non-contact, optical technique comprises analyzing a relationship between a corneal reflection and a pupil of an eye, using an inward-facing optical sensor mounted on the HMD.

At block 406, visual data is received from a rear-facing camera array. In an embodiment, the visual data comprises an image. In another embodiment, the visual data comprises video.

At block 408, a presentation is displayed from the HMD to the user when the direction of the head movement is consistent with the eye gaze, the presentation including the visual data from the rear-facing camera array. In an embodiment, displaying the presentation comprises selecting a camera from the rear-facing camera array that provides a video feed consistent with the direction of the head movement and the eye gaze and displaying the video feed in the HMD. In a further embodiment, the camera provides a stabilized image.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, logic or circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
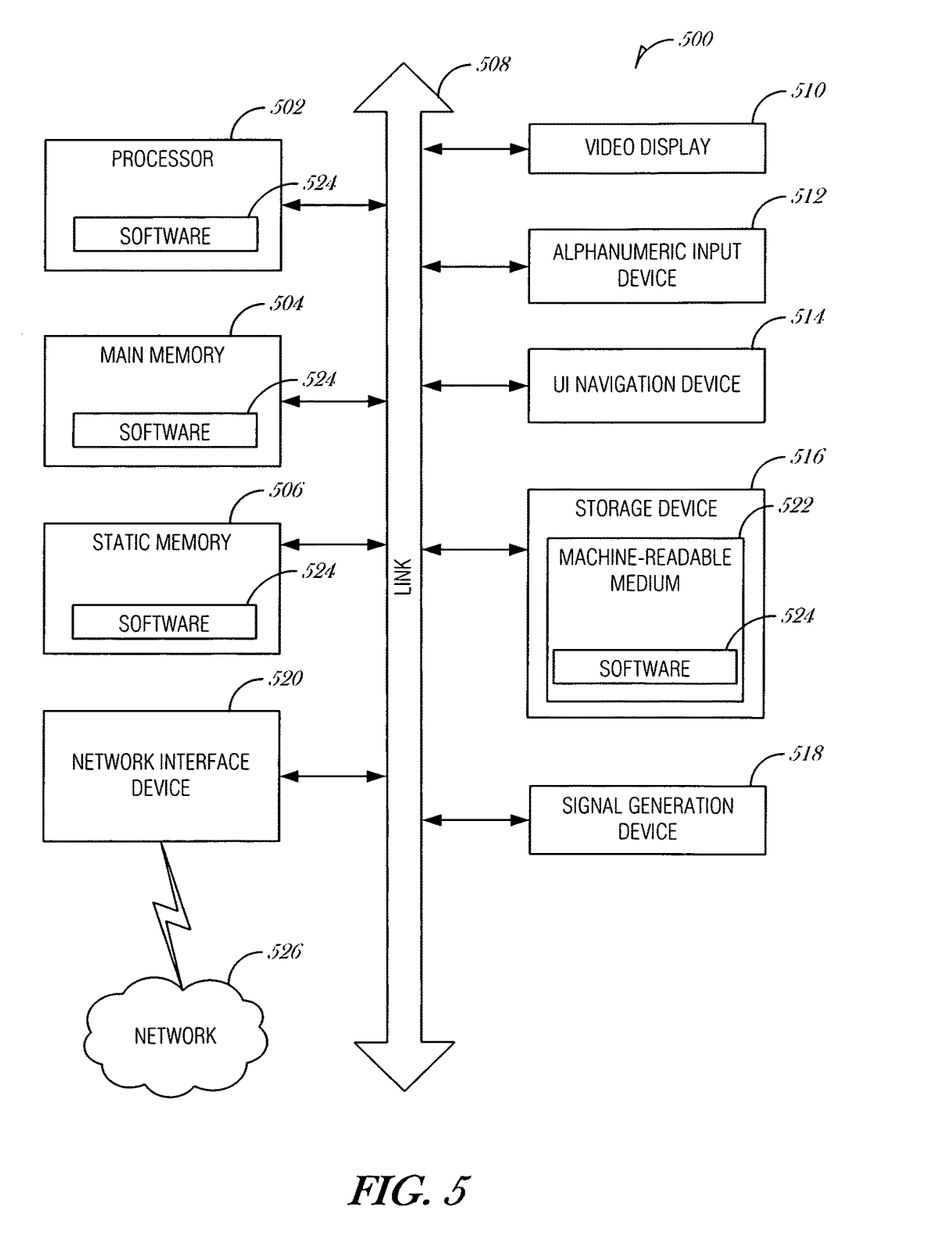
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) for displaying a rearview camera feed in a head-mounted display (HMD) comprising: a display surface; a motion detector to detect a head movement of a user of the head-mounted display, the head movement having a spatial direction; a gaze detection unit to detect an eye gaze of the user; a camera interface to receive visual data from a rear-facing camera array; and a presentation module to display a presentation on the display surface when the direction of the head movement is consistent with the eye gaze, the presentation including the visual data from the rear-facing camera array.

In Example 2, the subject matter of Example 1 may include, wherein the spatial direction comprises a pitch portion and a yaw portion, wherein the pitch portion and the yaw portion indicate that the head movement is to a side and down relative to an initial forward-center position.

In Example 3, the subject matter of any one of Examples 1 to 2 may include, wherein the presentation module is to discontinue displaying the presentation when the direction of the head movement returns to the initial forward-center position.

In Example 4, the subject matter of any one of Examples 1 to 3 may include, wherein to detect the head movement, the motion detector is to determine whether the head movement exceeds a threshold off-center yaw angle.

In Example 5, the subject matter of any one of Examples 1 to 4 may include, wherein the threshold off-center yaw angle is in the inclusive range of two degrees and ninety degrees.

In Example 6, the subject matter of any one of Examples 1 to 5 may include, wherein the threshold off-center yaw angle is configurable by the user.

In Example 7, the subject matter of any one of Examples 1 to 6 may include, wherein to detect the head movement, the motion detector is to determine whether the head movement exceeds a threshold off-horizontal pitch angle.

In Example 8, the subject matter of any one of Examples 1 to 7 may include, wherein to detect the eye gaze of the user, the gaze detection unit is to implement a non-contact, optical technique to track eye motion.

In Example 9, the subject matter of any one of Examples 1 to 8 may include, wherein the non-contact, optical technique comprises detecting projected infrared light that is reflected off of an eye using an inward-facing optical sensor mounted on the HMD.

In Example 10, the subject matter of any one of Examples 1 to 9 may include, wherein the non-contact, optical technique comprises analyzing a relationship between a corneal reflection and a pupil of an eye, using an inward-facing optical sensor mounted on the HMD.

In Example 11, the subject matter of any one of Examples 1 to 10 may include, wherein the visual data comprises an image.

In Example 12, the subject matter of any one of Examples 1 to 11 may include, wherein the visual data comprises video.

In Example 13, the subject matter of any one of Examples 1 to 12 may include, wherein the rear-facing camera array is incorporated into the HMD.

In Example 14, the subject matter of any one of Examples 1 to 13 may include, wherein the rear-facing camera array is wirelessly coupled to the HMD.

In Example 15, the subject matter of any one of Examples 1 to 14 may include, wherein to display the presentation, the presentation module is to: select a camera from the rear-facing camera array that provides a video feed consistent with the direction of the head movement and the eye gaze; and display the video feed on the display surface.

In Example 16, the subject matter of any one of Examples 1 to 15 may include, wherein the camera provides a stabilized image.

Example 17 includes subject matter (such as a method, means for performing acts, machine readable medium including instructions that when performed by a machine cause the machine to performs acts, or an apparatus to perform) for displaying a rearview camera feed in a head-mounted display (HMD) comprising: detecting at the HMD, a head movement of a user of the head-mounted display, the head movement having a spatial direction; detecting at the HMD, an eye gaze of the user; receiving visual data from a rear-facing camera array; and displaying a presentation from the HMD to the user when the direction of the head movement is consistent with the eye gaze, the presentation including the visual data from the rear-facing camera array.

In Example 18, the subject matter of Example 17 may include, wherein the spatial direction comprises a pitch portion and a yaw portion, wherein the pitch portion and the yaw portion indicate that the head movement is to a side and down relative to an initial forward-center position.

In Example 19, the subject matter of any one of Examples 17 to 18 may include, discontinuing displaying the presentation when the direction of the head movement returns to the initial forward-center position.

In Example 20, the subject matter of any one of Examples 17 to 19 may include, wherein detecting the head movement comprises: receiving data from an inertial measurement unit in the HMD; and determining whether the head movement exceeds a threshold off-center yaw angle.

In Example 21, the subject matter of any one of Examples 17 to 20 may include, wherein the threshold off-center yaw angle is in the inclusive range of two degrees and ninety degrees.

In Example 22, the subject matter of any one of Examples 17 to 21 may include, wherein the threshold off-center yaw angle is configurable by the user.

In Example 23, the subject matter of any one of Examples 17 to 22 may include, wherein detecting the head movement comprises: receiving data from an inertial measurement unit in the HMD; and determining whether the head movement exceeds a threshold off-horizontal pitch angle.

In Example 24, the subject matter of any one of Examples 17 to 23 may include, wherein detecting the eye gaze of the user comprises implementing a non-contact, optical technique to track eye motion.

In Example 25, the subject matter of any one of Examples 17 to 24 may include, wherein the non-contact, optical technique comprises detecting projected infrared light that is reflected off of an eye using an inward-facing optical sensor mounted on the HMD.

In Example 26, the subject matter of any one of Examples 17 to 25 may include, wherein the non-contact, optical technique comprises analyzing a relationship between a corneal reflection and a pupil of an eye, using an inward-facing optical sensor mounted on the HMD.

In Example 27, the subject matter of any one of Examples 17 to 26 may include, wherein the visual data comprises an image.

In Example 28, the subject matter of any one of Examples 17 to 27 may include, wherein the visual data comprises video.

In Example 29, the subject matter of any one of Examples 17 to 28 may include, wherein the rear-facing camera array is incorporated into the HMD.

In Example 30, the subject matter of any one of Examples 17 to 29 may include, wherein the rear-facing camera array is wirelessly coupled to the HMD.

In Example 31, the subject matter of any one of Examples 17 to 30 may include, wherein displaying the presentation comprises: selecting a camera from the rear-facing camera array that provides a video feed consistent with the direction of the head movement and the eye gaze; and displaying the video feed in the HMD.

In Example 32, the subject matter of any one of Examples 17 to 31 may include, wherein the camera provides a stabilized image.

Example 33 includes at least one machine-readable medium including instructions, which when executed by a machine, cause the machine to perform operations of any of the Examples 17-32.

Example 34 includes an apparatus comprising means for performing any of the Examples 17-32.

Example 35 includes subject matter (such as a device, apparatus, or machine) for displaying a rearview camera feed in a head-mounted display (HMD) comprising: means for detecting at the HMD, a head movement of a user of the head-mounted display, the head movement having a spatial direction; means for detecting at the HMD, an eye gaze of the user; means for receiving visual data from a rear-facing camera array; and means for displaying a presentation from the HMD to the user when the direction of the head movement is consistent with the eye gaze, the presentation including the visual data from the rear-facing camera array.

In Example 36, the subject matter of Example 35 may include, wherein the spatial direction comprises a pitch portion and a yaw portion, wherein the pitch portion and the yaw portion indicate that the head movement is to a side and down relative to an initial forward-center position.

In Example 37, the subject matter of any one of Examples 35 to 36 may include, means for discontinuing displaying the presentation when the direction of the head movement returns to the initial forward-center position.

In Example 38, the subject matter of any one of Examples 35 to 37 may include, wherein the means for detecting the head movement comprise: means for receiving data from an inertial measurement unit in the HMD; and means for determining whether the head movement exceeds a threshold off-center yaw angle.

In Example 39, the subject matter of any one of Examples 35 to 38 may include, wherein the threshold off-center yaw angle is in the inclusive range of two degrees and ninety degrees.

In Example 40, the subject matter of any one of Examples 35 to 39 may include, wherein the threshold off-center yaw angle is configurable by the user.

In Example 41, the subject matter of any one of Examples 35 to 40 may include, wherein the means for detecting the head movement comprise: means for receiving data from an inertial measurement unit in the HMD; and means for determining whether the head movement exceeds a threshold off-horizontal pitch angle.

In Example 42, the subject matter of any one of Examples 35 to 41 may include, wherein the means for detecting the eye gaze of the user comprise means for implementing a non-contact, optical technique to track eye motion.

In Example 43, the subject matter of any one of Examples 35 to 42 may include, wherein the non-contact, optical technique comprises detecting projected infrared light that is reflected off of an eye using an inward-facing optical sensor mounted on the HMD.

In Example 44, the subject matter of any one of Examples 35 to 43 may include, wherein the non-contact, optical technique comprises analyzing a relationship between a corneal reflection and a pupil of an eye, using an inward-facing optical sensor mounted on the HMD.

In Example 45, the subject matter of any one of Examples 35 to 44 may include, wherein the visual data comprises an image.

In Example 46, the subject matter of any One of Examples 35 to 45 may include, wherein the visual data comprises video.

In Example 47, the subject matter of any one of Examples 35 to 46 may include, wherein the rear-facing camera array is incorporated into the HMD.

In Example 48, the subject matter of any one of Examples 35 to 47 may include, wherein the rear-facing camera array is wirelessly coupled to the HMD.

In Example 49, the subject matter of any one of Examples 35 to 48 may include, wherein the means for displaying the presentation comprise: means for selecting a camera from the rear-facing camera array that provides a video feed consistent with the direction of the head movement and the eye gaze; and means for displaying the video feed in the HMD.

In Example 50, the subject matter of any one of Examples 35 to 49 may include, wherein the camera provides a stabilized image.

Example 51 includes subject matter (such as a device, apparatus, or machine) for displaying a rearview camera feed in a head-mounted display (HMD) comprising: a processor subsystem; and a memory including instructions, which when executed by the processor subsystem, cause the processor subsystem to: detect at the HMD, a head movement of a user of the head-mounted display, the head movement having a spatial direction; detect at the HMD, an eye gaze of the user; receive visual data from a rear-facing camera array; and display a presentation from the HMD to the user when the direction of the head movement is consistent with the eye gaze, the presentation including the visual data from the rear-facing camera array.

In Example 52, the subject matter of Example 51 may include, wherein the spatial direction comprises a pitch portion and a yaw portion, wherein the pitch portion and the yaw portion indicate that the head movement is to a side and down relative to an initial forward-center position.

In Example 53, the subject matter of any one of Examples 51 to 52 may include, instructions to discontinue displaying the presentation when the direction of the head movement returns to the initial forward-center position.

In Example 54, the subject matter of any one of Examples 51 to 53 may include, wherein the instructions to detect the head movement comprise instructions to: receive data from an inertial measurement unit in the HMD; and determine whether the head movement exceeds a threshold off-center yaw angle.

In Example 55, the subject matter of any one of Examples 51 to 54 may include, wherein the threshold off-center yaw angle is in the inclusive range of two degrees and ninety degrees.

In Example 56, the subject matter of any one of Examples 51 to 55 may include, wherein the threshold off-center yaw angle is configurable by the user.

In Example 57, the subject matter of any one of Examples 51 to 56 may include, wherein the instructions to detect the head movement comprise instructions to: receive data from an inertial measurement unit in the HMD; and determine whether the head movement exceeds a threshold off-horizontal pitch angle.

In Example 58, the subject matter of any one of Examples 51 to 57 may include, wherein the instructions to detect the eye gaze of the user comprise instructions to implement a non-contact, optical technique to track eye motion.

In Example 59, the subject matter of any one of Examples 51 to 58 may include, wherein the non-contact, optical technique comprises detecting projected infrared light that is reflected off of an eye using an inward-facing optical sensor mounted on the HMD.

In Example 60, the subject matter of any one of Examples 51 to 59 may include, wherein the non-contact, optical technique comprises analyzing a relationship between a corneal reflection and a pupil of an eye, using an inward-facing optical sensor mounted on the HMD.

In Example 61, the subject matter of any one of Examples 51 to 60 may include, wherein the visual data comprises an image.

In Example 62, the subject matter of any one of Examples 51 to 61 may include, wherein the visual data comprises video.

In Example 63, the subject matter of any one of Examples 51 to 62 may include, wherein the rear-facing camera array is incorporated into the HMD.

In Example 64, the subject matter of any one of Examples 51 to 63 may include, wherein the rear-facing camera array is wirelessly coupled to the HMD.

In Example 65, the subject matter of any one of Examples 51 to 64 may include, wherein the instructions to display the presentation comprise instructions to: select a camera from the rear-facing camera array that provides a video feed consistent with the direction of the head movement and the eye gaze; and display the video feed in the HMD.

In Example 66, the subject matter of any one of Examples 51 to 65 may include, wherein the camera provides a stabilized image.

Example 67 includes subject matter (such as a device, apparatus, or machine) for displaying a rearview camera feed in a head-mounted display (HMD) comprising: logic, at least partially implemented in hardware, to: receive head movement data, including a direction of head movement of a user of the head-mounted display, the head movement data having a spatial direction; receive eye gaze data, including a direction of eye gaze of the user; receive rear-facing visual data; and display a presentation on a display surface when the direction of the head movement is consistent with the eye gaze, the presentation including the rear-facing visual data.

In Example 68, the subject matter of Example 67 may include, wherein the spatial direction comprises a pitch portion and a yaw portion, wherein the pitch portion and the yaw portion indicate that the head movement is to a side and down relative to an initial forward-center position.

In Example 69, the subject matter of any one of Examples 67 to 68 may include, wherein the logic is to discontinue displaying the presentation when the direction of the head movement returns to the initial forward-center position.

In Example 70, the subject matter of any one of Examples 67 to 69 may include, wherein to detect the head movement, the logic is to determine whether the head movement exceeds a threshold off-center yaw angle.

In Example 71, the subject matter of any one of Examples 67 to 70 may include, wherein the threshold off-center yaw angle is in the inclusive range of two degrees and ninety degrees.

In Example 72, the subject matter of any one of Examples 67 to 71 may include, wherein the threshold off-center yaw angle is configurable by the user.

In Example 73, the subject matter of any one of Examples 67 to 72 may include, wherein to detect the head movement, the logic is to determine whether the head movement exceeds a threshold off-horizontal pitch angle.

In Example 74, the subject matter of any one of Examples 67 to 73 may include, wherein to detect the eye gaze of the user, the gaze detection unit is to implement a non-contact, optical technique to track eye motion.

In Example 75, the subject matter of any one of Examples 67 to 74 may include, wherein the non-contact, optical technique comprises detecting projected infrared light that is reflected off of an eye using an inward-facing optical sensor mounted on the HMD.

In Example 76, the subject matter of any one of Examples 67 to 75 may include, wherein the non-contact, optical technique comprises analyzing a relationship between a corneal reflection and a pupil of an eye, using an inward-facing optical sensor mounted on the HMD.

In Example 77, the subject matter of any one of Examples 67 to 76 may include, wherein the visual data comprises an image.

In Example 78, the subject matter of any one of Examples 67 to 77 may include, wherein the visual data comprises video.

In Example 79, the subject matter of any one of Examples 67 to 78 may include, wherein the rear-facing camera array is incorporated into the HMD.

In Example 80, the subject matter of any one of Examples 67 to 79 may include, wherein the rear-facing camera array is wirelessly coupled to the HMD.

In Example 81, the subject matter of any one of Examples 67 to 80 may include, wherein to display the presentation, the logic is to: select a camera from the rear-facing camera array that provides a video feed consistent with the direction of the head movement and the eye gaze; and display the video feed on the display surface.

In Example 82, the subject matter of any one of Examples 67 to 81 may include, wherein the camera provides a stabilized image.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for displaying a rearview camera feed in a head-mounted display (HMD), the system comprising:
   a display surface;
   a motion detector to detect a head movement of a user of the head-mounted display, the head movement having a spatial direction;
   a gaze detection unit to detect an eye gaze of the user;
   a camera interface to receive visual data from a rear-facing camera array; and
   a presentation module to display a presentation on the display surface when the direction of the head movement is consistent with a direction of the eye gaze, the presentation including the visual data selected from a camera from the rear-facing camera array, and that provides a video feed consistent with the direction of the head movement and the eye gaze.

2. The system of claim 1, wherein the spatial direction comprises a pitch portion and a yaw portion, wherein the pitch portion and the yaw portion indicate that the head movement is to a side and down relative to an initial forward-center position.

3. The system of claim 2, wherein the presentation module is to discontinue displaying the presentation when the direction of the head movement returns to the initial forward-center position.

4. The system of claim 1, wherein to detect the head movement, the motion detector is to determine whether the head movement exceeds a threshold off-center yaw angle.

5. The system of claim 4, wherein the threshold off-center yaw angle is configurable by the user.

6. The system of claim 1, wherein the rear-facing camera array is incorporated into the HMD.

7. The system of claim 1, wherein the rear-facing camera array is wirelessly coupled to the HMD.

8. The system of claim 1, wherein the camera provides a stabilized image.

9. At least one non-transitory machine-readable medium including instructions, which when executed by a machine, cause the machine to perform operations of:
   detecting at the HMD, a head movement of a user of the head-mounted display, the head movement having a spatial direction;
   detecting at the HMD, an eye gaze of the user;
   receiving visual data from a rear-facing camera array; and
   displaying a presentation from the HMD to the user when the direction of the head movement is consistent with a direction of the eye gaze, the presentation including the visual data selected from a camera from the rear-facing camera array, and that provides a video feed consistent with the direction of the head movement and the eye gaze.

10. The at least one non-transitory machine-readable medium of claim 9, wherein the spatial direction comprises a pitch portion and a yaw portion, wherein the pitch portion and the yaw portion indicate that the head movement is to a side and down relative to an initial forward-center position.

11. The at least one non-transitory machine-readable medium of claim 10, further comprising instructions to perform the operations of: discontinuing displaying the presentation when the direction of the head movement returns to the initial forward-center position.

12. The at least one non-transitory machine-readable medium of claim 9, wherein the instructions to detect the head movement comprise instructions to perform the operations of:
   receiving data from an inertial measurement unit in the HMD; and
   determining whether the head movement exceeds a threshold off-center yaw angle.

13. The at least one non-transitory machine-readable medium of claim 12, wherein the threshold off-center yaw angle is in the inclusive range of two degrees and ninety degrees.

14. The at least one non-transitory machine-readable medium of claim 12, wherein the threshold off-center yaw angle is configurable by the user.

15. The at least one non-transitory machine-readable medium of claim 9, wherein instructions to detect the head movement comprise instructions to perform the operations of:
receiving data from an inertial measurement unit in the HMD; and
determining whether the head movement exceeds a threshold off-horizontal pitch angle.

16. The at least one non-transitory machine-readable medium of claim 9, wherein instructions to detect the eye gaze of the user comprise instructions to perform the operations of implementing a non-contact, optical technique to track eye motion.

17. The at least one non-transitory machine-readable medium of claim 16, wherein the non-contact, optical technique comprises detecting projected infrared light that is reflected off of an eye using an inward-facing optical sensor mounted on the HMD.

18. The at least one non-transitory machine-readable medium of claim 9, wherein the rear-facing camera array is wirelessly coupled to the HMD.

19. The at least one non-transitory machine-readable medium of claim 9, wherein the camera provides a stabilized image.

20. A system for displaying a rearview camera feed in a head-mounted display (HMD), the system comprising:
a processor subsystem; and
a memory including instructions, which when executed by the processor subsystem, cause the processor subsystem to:
detect at the HMD, a head movement of a user of the head-mounted display, the head movement having a spatial direction;
detect at the HMD, an eye gaze of the user;
receive visual data from a rear-facing camera array; and
display a presentation from the HMD to the user when the direction of the head movement is consistent with a direction of the eye gaze, the presentation including the visual data selected from a camera from the rear-facing camera array, and that provides a video feed consistent with the direction of the head movement and the eye gaze.

21. The system of claim 20, wherein the spatial direction comprises a pitch portion and a yaw portion, wherein the pitch portion and the yaw portion indicate that the head movement is to a side and down relative to an initial forward-center position.

22. The system of claim 21, further comprising instructions to discontinue displaying the presentation when the direction of the head movement returns to the initial forward-center position.

23. A method of displaying a rearview camera feed in a head-mounted display (HMD), the method comprising:
detecting at the HMD, a head movement of a user of the head-mounted display, the head movement having a spatial direction;
detecting at the HMD, an eye gaze of the user;
receiving visual data from a rear-facing camera array; and
displaying a presentation from the HMD to the user when the direction of the head movement is consistent with a direction of the eye gaze, the presentation including the visual data selected from a camera from the rear-facing camera array, and that provides a video feed consistent with the direction of the head movement and the eye gaze.

24. The method of claim 23, wherein the spatial direction comprises a pitch portion and a yaw portion, wherein the pitch portion and the yaw portion indicate that the head movement is to a side and down relative to an initial forward-center position.

25. The method of claim 24, further comprising discontinuing displaying the presentation when the direction of the head movement returns to the initial forward-center position.

26. The method of claim 23, wherein detecting the head movement comprises:
receiving data from an inertial measurement unit in the HMD; and
determining whether the head movement exceeds a threshold off-center yaw angle.

27. The method of claim 26, wherein the threshold off-center yaw angle is configurable by the user.

* * * * *